(12) United States Patent
Morris et al.

(10) Patent No.: US 11,029,542 B2
(45) Date of Patent: Jun. 8, 2021

(54) EYEWEAR WITH ADJUSTABLE INDICATION OF VISION FIELD

(71) Applicant: Vision Field Technologies, LLC, Walnutport, PA (US)

(72) Inventors: David Morris, Treichlers, PA (US); Fred Kimock, Macungie, PA (US)

(73) Assignee: Vision Field Technologies, LLC, Walnutport, PA (US)

( * ) Notice: Subject to any disclaimer, the term of this patent is extended or adjusted under 35 U.S.C. 154(b) by 274 days.

(21) Appl. No.: 16/124,952

(22) Filed: Sep. 7, 2018

(65) Prior Publication Data
US 2020/0081272 A1 Mar. 12, 2020

(51) Int. Cl.
*G02C 7/16* (2006.01)
*G02C 5/20* (2006.01)

(52) U.S. Cl.
CPC ............. *G02C 7/16* (2013.01); *G02C 5/20* (2013.01)

(58) Field of Classification Search
USPC ........ 351/44–48, 57, 158; 2/6.3–6.5, 12, 13, 2/15, 434; D16/300, 301, 310
See application file for complete search history.

(56) References Cited

U.S. PATENT DOCUMENTS

| | | | |
|---|---|---|---|
| 1,723,474 A | 8/1929 | Esleck | |
| 3,389,406 A * | 6/1968 | Mitchell | A61F 9/025 2/434 |
| 3,689,136 A | 9/1972 | Zaven Atamian | |
| 4,105,304 A | 8/1978 | Baker | |
| 4,298,991 A | 11/1981 | Recenello | |
| 5,877,837 A | 3/1999 | Hayes | |
| 7,147,320 B2 | 12/2006 | Werner | |
| 9,314,376 B1 | 4/2016 | Sherer et al. | |
| 2013/0314667 A1* | 11/2013 | Cislo | G02C 9/04 351/159.78 |
| 2017/0010481 A1* | 1/2017 | Ryan | G02C 5/14 |
| 2017/0056742 A1 | 3/2017 | Glynn et al. | |

* cited by examiner

*Primary Examiner* — Darryl J Collins
(74) *Attorney, Agent, or Firm* — Barley Snyder

(57) ABSTRACT

An eyewear with an adjustable indication of vision field comprises an eyewear frame having a right side and a left side opposite the right side, a shade positioning assembly attached to one of the right side and the left side of the eyewear frame, and a shade attached to the eyewear frame at the shade positioning assembly. The eyewear frame has a pair of lens areas positioned between the right side and the left side and adapted to be aligned with a pair of eyes of a user. The shade is formed of a transparent material. The shade is movable along the shade positioning assembly to a plurality of positions among which the shade covers a varying amount of one of the lens areas.

33 Claims, 7 Drawing Sheets

EYEWEAR WITH ADJUSTABLE INDICATION OF VISION FIELD

FIELD OF THE INVENTION

The present invention relates to eyewear and, more particularly, to eyewear with an adjustable indication of vision field for eye and vision field training.

BACKGROUND

Accurate visual perception directly impacts performance in a range of activities including playing sports, driving a car, reading, and myriad other aspects of daily life. Prescriptive correction is one well-known method of improving the accuracy of visual perception. Visual perception, however, is also heavily influenced by ocular dominance; the vast majority of people have one stronger or dominant eye that is primarily relied upon for precise positional information. A person's most accurate field of vision or primary vision field is influenced by the location of the dominant eye and its relation to the physical features of the person's head. Performance issues, such as errors in sports or driving accidents, can arise, for example, when a ball or another car is positioned outside of the primary vision field. Motion outside of the primary vision field can also be a cause of motion sickness.

Previous attempts to compensate for a person's dominant eye and corresponding primary vision field have focused on strengthening the non-dominant eye in an attempt to make the eyes of equal dominance. Although attempting to train perception of the non-dominant eye can offer a small improvement, biologically, the dominant eye has increased neural connectivity, and conveys an image faster to the brain when compared with the non-dominant eye, and potential improvement in the non-dominant eye is consequently limited.

SUMMARY

An eyewear with an adjustable indication of vision field comprises an eyewear frame having a right side and a left side opposite the right side, a shade positioning assembly attached to one of the right side and the left side of the eyewear frame, and a shade attached to the eyewear frame at the shade positioning assembly. The eyewear frame has a pair of lens areas positioned between the right side and the left side and adapted to be aligned with a pair of eyes of a user. The shade is formed of a transparent material. The shade is movable along the shade positioning assembly to a plurality of positions among which the shade covers a varying amount of one of the lens areas.

BRIEF DESCRIPTION OF THE DRAWINGS

The invention will now be described by way of example with reference to the accompanying figures, of which.

DETAILED DESCRIPTION OF THE EMBODIMENTS

Figure 1:
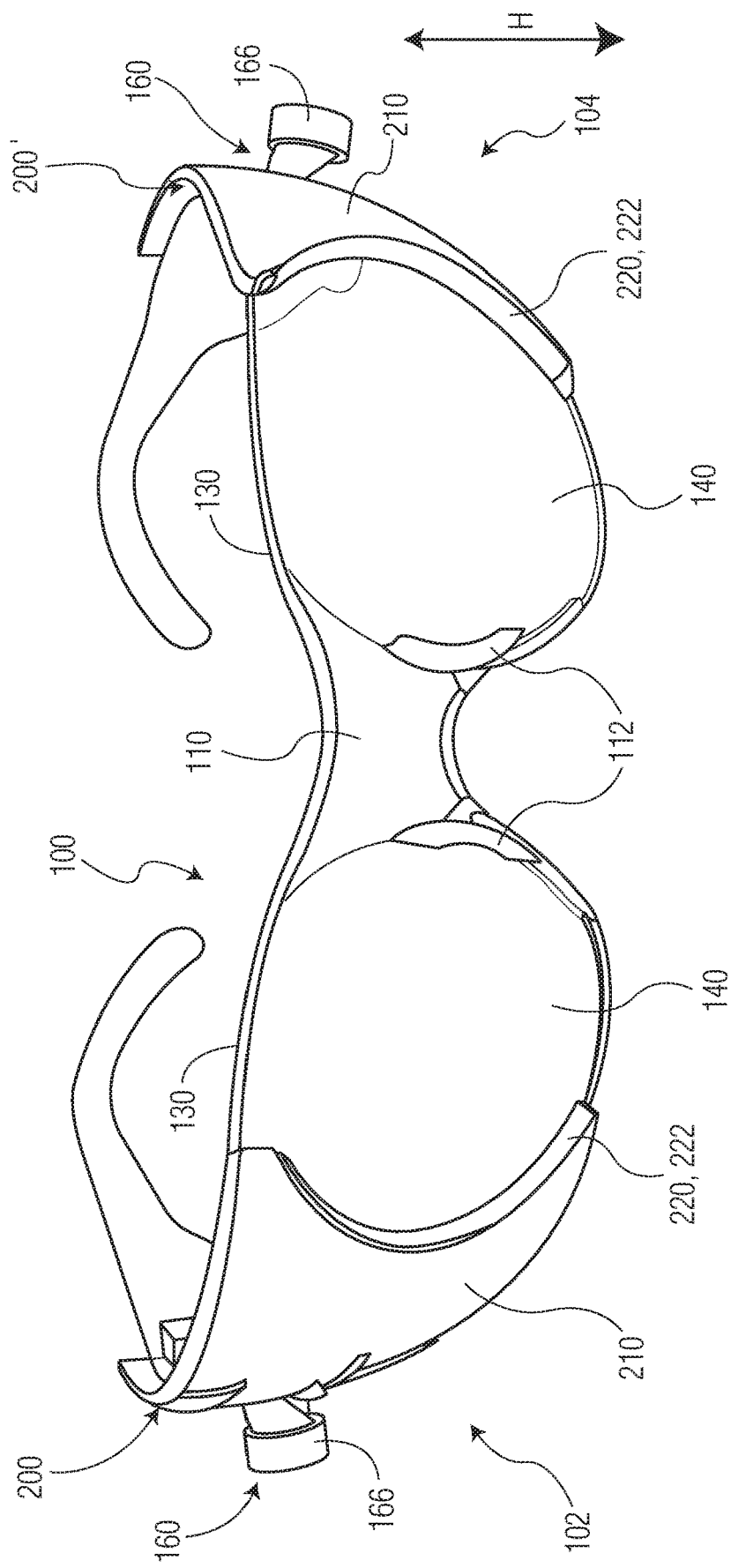
FIG. 1 is a front view of an eyewear according to an embodiment.

Exemplary embodiments of the present invention will be described hereinafter in detail with reference to the attached drawings, wherein like reference numerals refer to like elements. The present invention may, however, be embodied in many different forms and should not be construed as being limited to the embodiments set forth herein; rather, these embodiments are provided so that the present disclosure will be thorough and complete, and will fully convey the concept of the disclosure to those skilled in the art.

Figure 2:
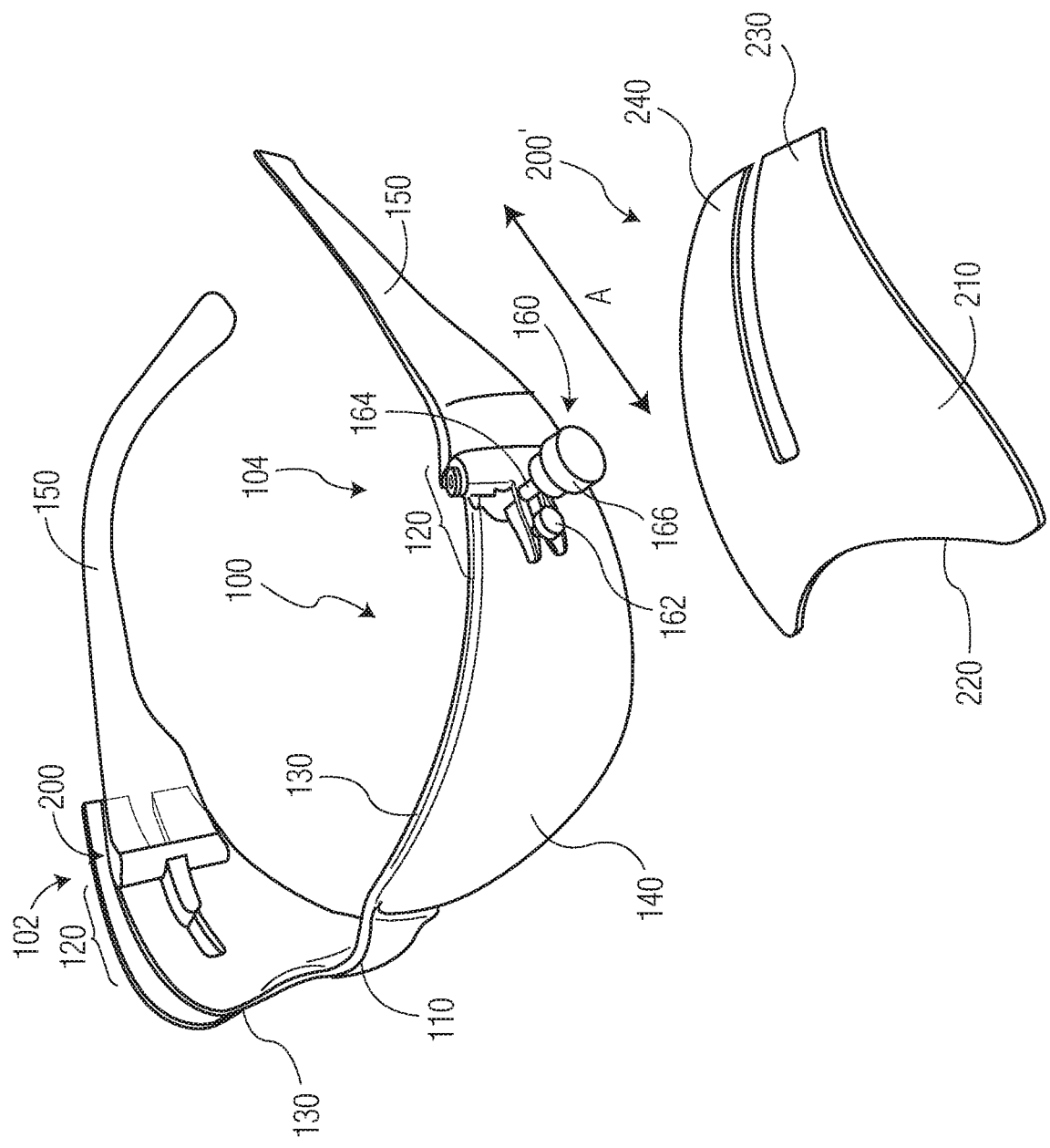
FIG. 2 is a perspective view of the eyewear with a shade removed.
Figure 3:
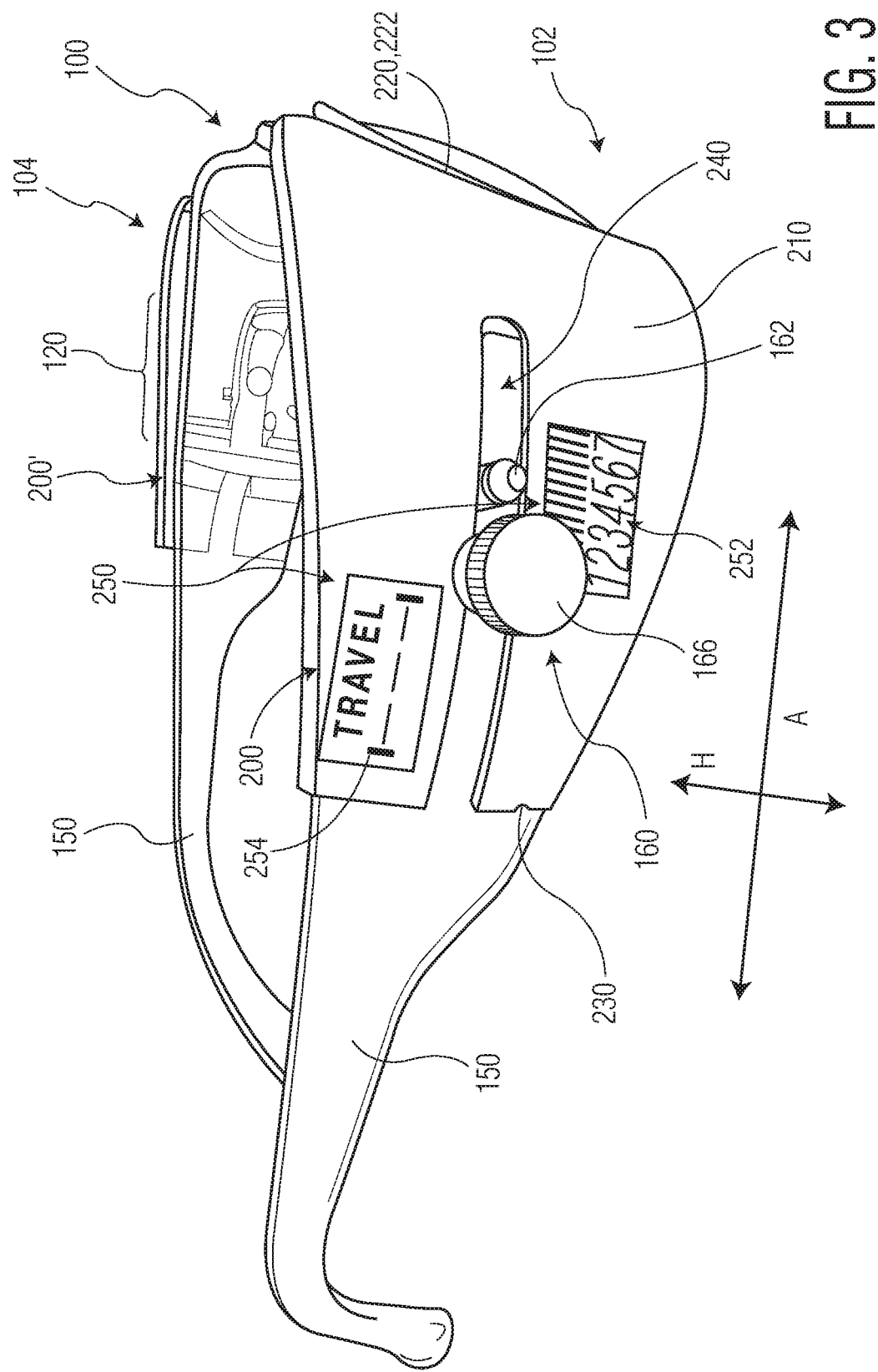
FIG. 3 is a side view of the eyewear.

An eyewear with an adjustable indication of vision field according to an embodiment is shown in FIGS. 1-3. The eyewear includes an eyewear frame 100, a pair of shade positioning assemblies 160 each attached to one of a right side 102 and a left side 104 of the eyewear frame 100, and a pair of shades 200, 200' each attached to the eyewear frame 100 at one of the shade positioning assemblies 160. Throughout the description of the eyewear, the orientation terms "right" and "left" are used to refer to right and left sides of the eyewear from the perspective of a user wearing the eyewear.

The eyewear frame 100, as shown in FIGS. 1 and 2, includes a bridge 110 positioned approximately centrally between the right side 102 and the left side 104 of the eyewear frame 100, a pair of end sections 120 each positioned on one of the right side 102 and the left side 104, a top bar 130 connecting the bridge 110 with the end sections 120, and a pair of arms 150 each extending from one of the end sections 120. The arms 150 are each hingeably connected to the end sections 120 and are shaped to fit behind a user's ear. In an embodiment, the eyewear frame 100 includes a pair of lens areas 140; each of the lens areas 140 is defined between the bridge 110, the top bar 130, and one of the end sections 120.

As shown in the embodiment of FIG. 1, the bridge 110 has a pair of delineator stripes 112 disposed on opposite sides of the bridge 110 at an intersection of the bridge 110 with the lens areas 140. In an embodiment, the delineator stripes 112 are each a blaze orange color. In other embodiments, the delineator stripes 112 may be any other high contrast or highly visible color known to those with ordinary skill in the art. In another embodiment, the delineator stripes 112 may be omitted. In various embodiments, the bridge 110 can be clear transparent, colored transparent, translucent, or opaque.

In the shown embodiment, the eyewear frame 100 is a pair of safety glasses formed of a transparent polycarbonate material. In this embodiment, the lens areas 140 are formed of a solid transparent material and the bridge 110, the end sections 120, the top bar 130, and the lens areas 140 are monolithically formed in a single piece. In the shown embodiment, the material of the lens areas 140 is protective and is not corrective. In another embodiment, the eyewear frame 100 is a pair of goggles, such as a pair of ski goggles.

In other embodiments, the eyewear frame 100 may be any structure capable of being worn on a user's head with the bridge 110 positioned above the user's nose, the end sections 120 positioned on right and left sides of the user's head, the arms 150 extending behind the user's ears to hold the eyewear frame 100 in position, and the lens areas 140 aligned with the user's eyes. In embodiments in which the lens areas 140 are solid, the lens areas 140 may be formed separately from the bridge 110, the end sections 120, and the top bar 130, and may be either corrective or not corrective. In some embodiments, the lens areas 140 are open spaces with the bridge 110, the top bar 130, and the end sections 120 at least partially circumscribing each of the user's eyes. The eyewear frame 100 may be formed of other plastic or metal materials with the bridge 110, the end sections 120, and the top bar 130 monolithically formed in a single piece or assembled from separate components which may be formed of different materials.

Each of the shade positioning assemblies 160, as shown in FIGS. 1-3, is attached to the eyewear frame 100 at one of the end sections 120 with one of the shade positioning assemblies 160 disposed at each of the right side 102 and the left side 104 of the eyewear frame 100.

Each of the shade positioning assemblies 160, as shown in the embodiment of FIGS. 2 and 3, includes a guide post 162, a positioning stem 164, and a positioning nut 166. The guide post 162 and the positioning stem 164 both extend out from the end section 120 in a direction perpendicular to a surface of the end section 120. The guide post 162 and the positioning stem 164 are aligned with one another along a front to rear axis A and are spaced apart from one another along the front to rear axis A. The guide post 162 has approximately a same diameter along a height axis H as the positioning stem 164. In each of the shade positioning assemblies 160, the guide post 162 is positioned closer to the lens area 140 than the positioning stem 164.

The positioning nut 166, as shown in FIGS. 2 and 3, is disposed on an end of the positioning stem 164 opposite the end section 120. The positioning nut 166 has a diameter larger than the diameter of the positioning stem 164 along the height axis H and is movable along the positioning stem 164 between a loosened position and a tightened position. In an embodiment, the positioning stem 164 has an outer thread on the end opposite the end section 120 and the positioning nut 166 has an inner thread and is movable along the positioning stem 164 by turning the positioning nut 166. In other embodiments, the positioning stem 164 and the positioning nut 166 may have any structure that allows the positioning nut 166 to be moved between and retained in the loosened position and the tightened position.

The shades 200, 200', as shown in FIGS. 1-3, are each attached to one of the shade positioning assemblies 160. The shade 200 will be described in detail below. The shade 200' is a mirror image of, and may be identical to the shade 200 and has all the same components as the shade 200. Throughout the description, the shade 200' is denoted with an apostrophe only for ease of differentiating a below description related to a left shade 200' attached to the shade positioning assembly 160 on the left side 104 from a right shade 200 attached to the shade positioning assembly 160 positioned on the right side 102. The similarly numbered components of the shade 200 and the shade 200' are otherwise identical unless explicitly noted below.

As shown in FIGS. 1-3, the shade 200 has a contoured body 210 with a curved lens side 220, an opposite arm side 230, an adjustment slot 240 extending through the contoured body 210, and a plurality of position indicators 250 disposed on the contoured body 210.

The contoured body 210, in the embodiment shown in FIGS. 1-3, has a contoured shape between the curved lens side 220 and the arm side 230 that is adapted to a contoured shape of the eyewear frame 100 extending along the lens area 140 and the end section 120. The contoured body 210 is formed of a transparent plastic material that is colored or tinted to be a different color than the lens areas 140. The contoured body 210 may be tinted a dark color similar to sunglasses, e.g. green, gray, green-gray, or brown, or a yellow color, or any other color capable of permitting transparent viewing. In another embodiment, the contoured body 210 may be a clear transparent material.

A curved shape of the curved lens side 220 along the height axis H is adapted to match a curved shape of a structure along the height axis H that delineates an edge of the vision field; the structure could be a bridge of the user's nose, the bridge 110, or, as in the shown embodiment, the delineator stripe 112 at an intersection of the bridge 110 with the lens area 140 on the opposite side of the eyewear frame 100. In the embodiment shown in FIG. 1, the curved shape of the curved lens side 220 of the right shade 200 matches the curved shape of the intersection of the bridge 110 with the lens area 140 positioned closer to the left side 104, while the curved shape of the curved lens side 220 of the left shade 200' matches the curved shape of the intersection of the bridge with the lens area 140 positioned closer to the right side 102. In the embodiment shown in FIGS. 1 and 3, the curved lens side 220 has a shade highlighting stripe 222. In an embodiment, the shade highlighting stripes 222 are each a blaze orange color. In other embodiments, the shade highlighting stripes 222 may be any other high contrast or highly visible color known to those with ordinary skill in the art.

The adjustment slot 240, as shown in FIGS. 2 and 3, extends approximately centrally through the contoured body 210 along the height axis H and from the arm side 230 toward the curved lens side 220 along the front to rear axis A and, in an the shown embodiment, over more than half of the contoured body 210 along the front to rear axis A. A height of the adjustment slot 240 along the height access H is slightly larger than the diameter of the guide post 162 and the positioning stem 164, and is smaller than the diameter of the positioning nut 166, as shown in FIG. 3.

The position indicators 250 are disposed on an outer surface of the contoured body 210 and, as shown in FIG. 3, include a personal optimized position gauge 252 and a travel position gauge 254. The personal optimized position gauge 252 and the travel position gauge 254 are both positioned to extend along the adjustment slot 240. The personal optimized position gauge 252 is positioned closer to the curved lens side 220 and the travel position gauge 254 is positioned immediately adjacent a side of the personal optimized position gauge 252 closer to the arm side 230. In the shown embodiment, the personal optimized position gauge 252 is a sequential series of numbers and the travel position gauge 254 is a schematically indicated range. In other embodiments, the personal optimized position gauge 252 and the travel position gauge 254 may have any denotation that can indicate a relative position along the adjustment slot 240. The only difference between the right shade 200 and the left shade 200' would be the orientation of the personal optimized position gauge 252 and the travel position gauge 254 along the adjustment slot 240 to permit reading by the user.

As shown in FIGS. 1-3, the right shade 200 is attached to the shade positioning assembly 160 on the right side 102 of the eyewear frame 100 and the left shade 200' is attached to the shade positioning assembly 160 on the left side 104 of the eyewear frame 100. To attach the shades 200, 200' to the eyewear frame 100 at the shade positioning assemblies 160, the adjustment slot 240 at the arm side 230 of each shade 200, 200' is aligned with the guide post 162 and the positioning stem 164 of the shade positioning assembly 160. The shade 200, 200' is slid onto the guide post 162 and the positioning stem 164 along the front to rear axis A and is positioned between the end section 120 and the positioning nut 166. The guide post 162 and the positioning stem 164 are positioned in the adjustment slot 240 and restrict movement of the shade 200, 200' to be only along the front to rear axis A.

With the positioning nut 166 in the loosened position, the shade 200, 200' is movable along the front to rear axis A between a retracted position in which a first end of the adjustment slot 240 abuts the guide post 162 and an extended position in which a second end of the adjustment slot 240 at the arm side 230 is located at the positioning stem 164. The shade 200, 200' does not cover the lens area 140 in the retracted position and covers a maximum portion of the lens area 140 in the extended position. The shade 200, 200' is also movable to a plurality of positions between the retracted position and the extended position as shown in FIGS. 1 and 3 among which the shade 200, 200' covers a varying amount of the lens area 140, including a plurality of personal optimization positions indicated by the personal optimized position gauge 252 and a plurality of travel positions indicated by the travel position gauge 254. When the shade 200, 200' is in the desired position, the positioning nut 166 is moved to the tightened position and holds the shade 200, 200' in the desired position against the end section 120.

A method of setting the eyewear to compensate for the user's dominant eye and corresponding primary vision field will now be described in greater detail with reference to FIGS. 4 and 5A-5C.

Figure 4:
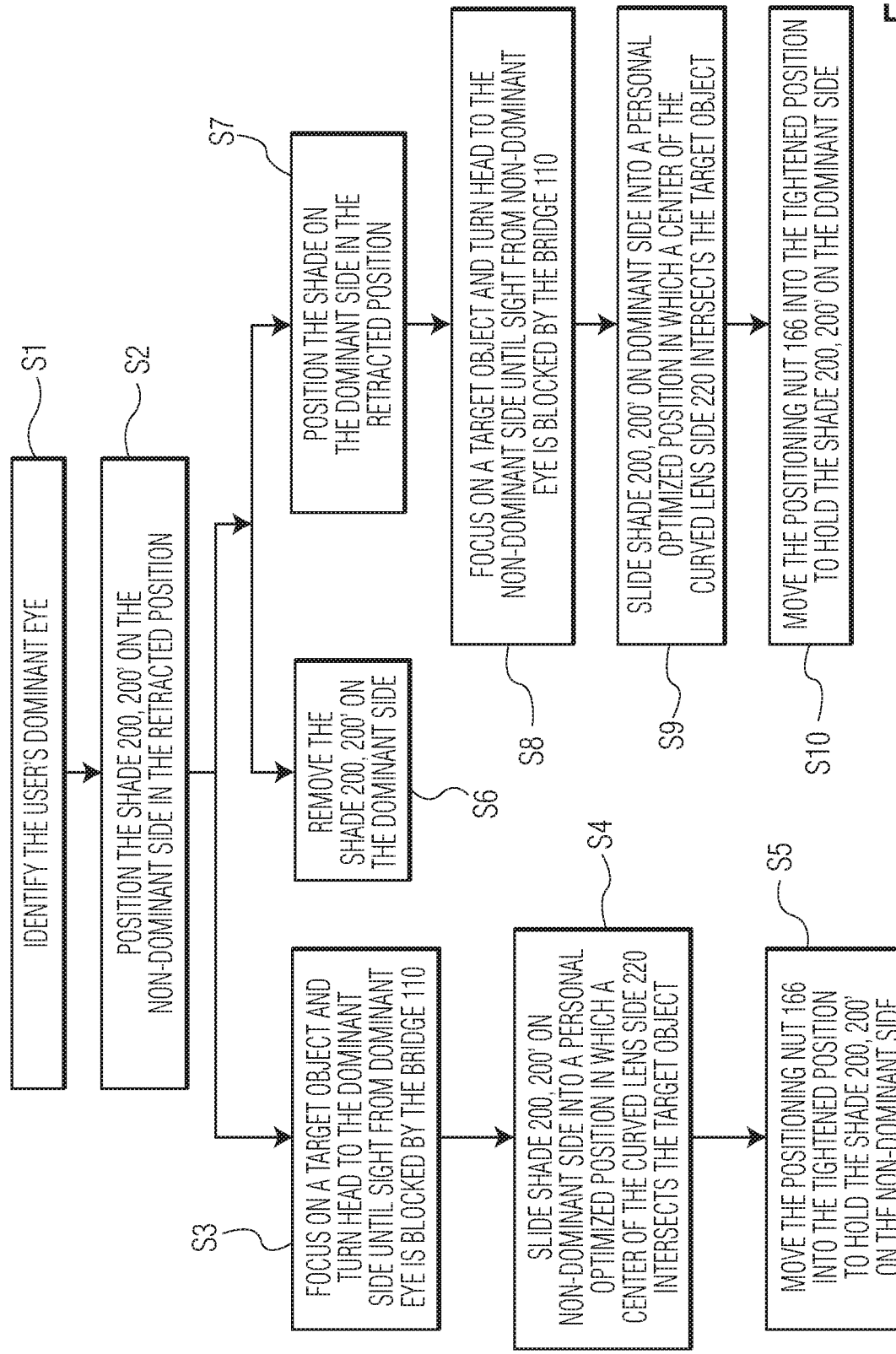
FIG. 4 is a flow diagram of a process of setting the eyewear.

In a first step S1 shown in FIG. 4, the user's dominant eye is identified. The user's dominant eye can be identified by a number of known methods typically including identifying a target object in the distance, viewing the target object through an opening formed in an instrument or a small opening formed by the user's hands, and then sequentially closing the user's eyes. If the target object remains centered in the opening when the user closes the right eye, the user is left eye dominant. Conversely, if the target object remains centered in the opening when the user closes the left eye, the user is right eye dominant. The non-dominant eye of the user is identified by virtue of determining the dominant eye, and the dominant eye and the non-dominant eye each correspond, respectively, to a dominant side and a non-dominant side of a user's head.

After the user's dominant eye is identified, in a step S2 shown in FIG. 4, the shade 200, 200' on the side 102, 104 of the user's non-dominant eye is moved to the retracted position. The positioning nut 166 is moved to the loosened position and the shade 200, 200' is slid along the front to rear axis A into the retracted position in which the first end of the adjustment slot 240 abuts the guide post 162.

With the shade 200, 200' on the side 102, 104 of the user's non-dominant eye moved to the retracted position, in a step S3 shown in FIG. 4, the user focuses on a stationary target object. In an exemplary embodiment, the stationary target object is approximately dime-sized and is approximately 8 feet away from the user. In other embodiments, the size and distance of the stationary target object is related to an application in which the user intends to use the eyewear. While remaining focused on the stationary target object, the user turns his or her head to the dominant side until sight of the stationary target object from the dominant eye begins to be blocked by the bridge 110 or the bridge of the user's nose. The delineator stripe 112 helps the user to determine when the bridge 110 begins to block the stationary target object.

Figure 5B:
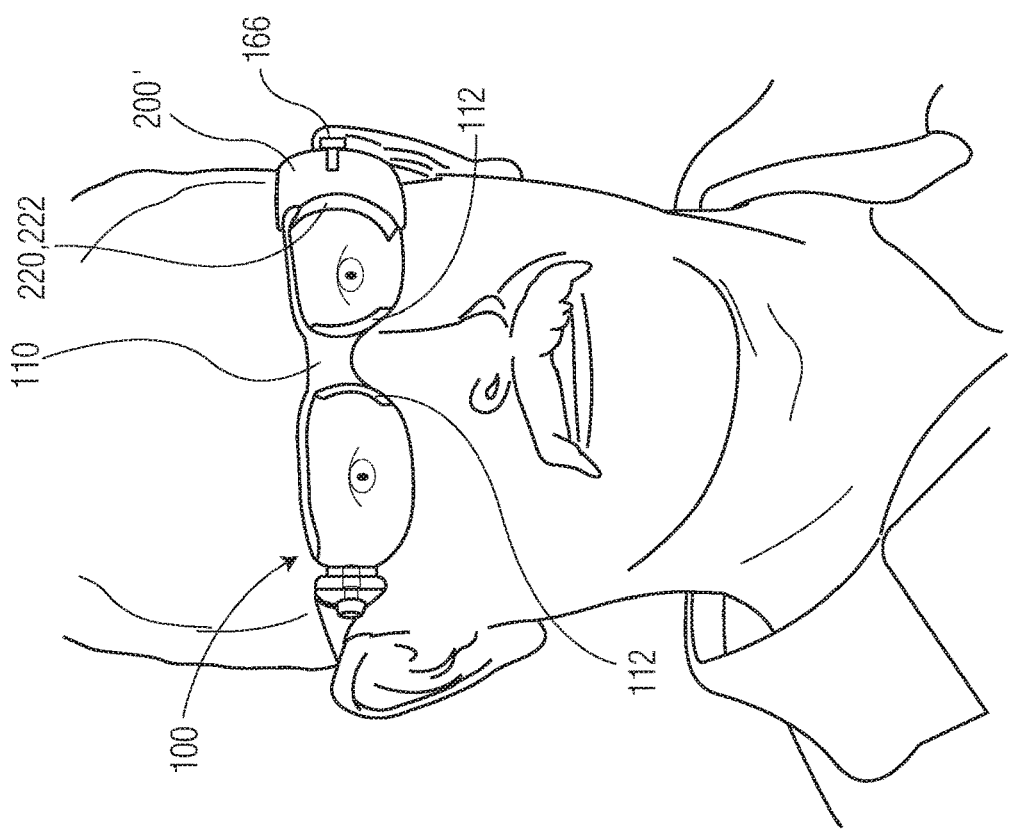
FIG. 5B is a front view of the user wearing the eyewear after the completing the process of FIG. 4.
Figure 5A:
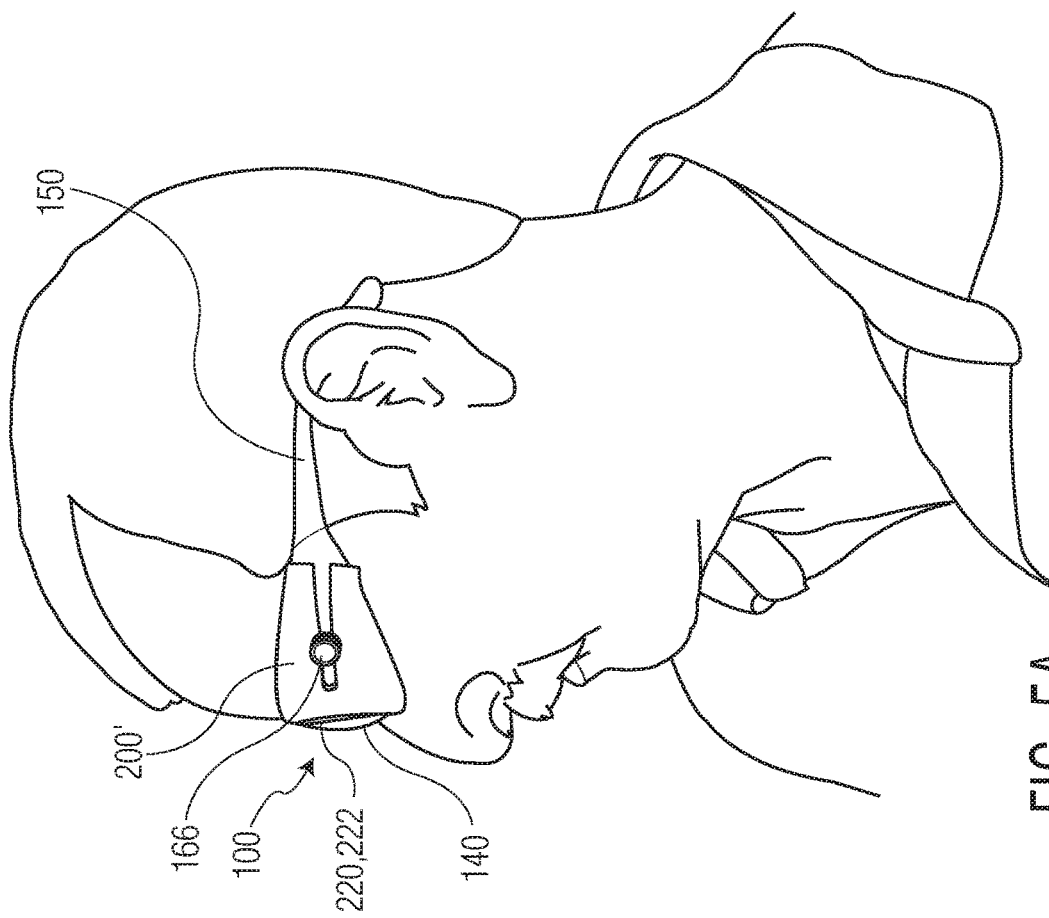
FIG. 5A is a side view of a user wearing the eyewear according to a step of the process of FIG. 4.

With the head held in the turned position from step S3, the user slides the shade 200, 200' on the side 102, 104 of the user's non-dominant eye from the retracted position along the front to rear axis A until a center of the curved lens side 220 intersects the stationary target object in a step S4 shown in FIG. 4. A position in which the center of the curved lens side 220 intersects the stationary target object is a personal optimized position for the user. The personal optimized position for a particular user is indicated by the personal optimized position gauge 252 as shown in FIG. 3. The shade highlighting stripe 222 helps the user to determine when the curved lens side 220 intersects the stationary target object. An exemplary view of the result of the step S4 for a right eye dominant user is shown in FIG. 5A.

In a next step S5, the user moves the positioning nut 166 on the side 102, 104 of the user's non-dominant eye into the tightened position to hold the shade 200, 200' on the non-dominant side in the personal optimized position.

The method, as shown in FIG. 4, includes two different embodiments for setting the shade 200, 200' on the side 102, 104 of the user's dominant eye.

In a first embodiment shown in step S6, the shade 200, 200' on the side 102, 104 of the user's dominant eye is removed. The positioning nut 166 is moved to the loosened position and the shade 200, 200' is slid along the front to rear axis A off of the guide post 162 and the positioning stem 164. In an embodiment, the shade 200, 200' on the side 102, 104 of the user's dominant eye may be removed before the shade 200, 200' on the side 102, 104 of the user's non-dominant eye is positioned in the retracted position, that is, step S6 may be performed after step S1 and before step S2. An exemplary final setting of the eyewear including the first embodiment removing the shade 200, 200' on the side 102, 104 of the user's dominant eye, for a right eye dominant user, is shown in FIG. 5B.

In a second embodiment shown in steps S7-S10 of FIG. 4, the shade 200, 200' on the side 102, 104 of the user's dominant eye is retained on the shade positioning assembly 160 and is positioned analogously to the shade 200, 200' on the side 102, 104 of the user's non-dominant eye described above with reference to steps S3-S5.

In a step S7, the shade 200, 200' on the side 102, 104 of the user's dominant eye is moved to the retracted position. The positioning nut 166 is moved to the loosened position and the shade 200, 200' is slid along the front to rear axis A into the retracted position in which the first end of the adjustment slot 240 abuts the guide post 162.

With the shade 200, 200' on the side 102, 104 of the user's dominant eye moved to the retracted position, in a step S8 shown in FIG. 4, the user focuses on the stationary target object. While remaining focused on the stationary target object, the user turns his or her head to the non-dominant side until sight of the stationary target object from the non-dominant eye begins to be blocked by the bridge 110. The delineator stripe 112 helps the user to determine when the bridge 110 begins to block the stationary target object.

With the head held in the turned position from step S8, the user slides the shade 200, 200' on the side 102, 104 of the user's dominant eye from the retracted position along the front to rear axis A until a center of the curved lens side 220 intersects the stationary target object in a step S9 shown in FIG. 4. A position in which the center of the curved lens side 220 intersects the stationary target object is a personal optimized position for the user. The personal optimized position for a particular user is indicated by the personal optimized position gauge 252 as shown in FIG. 3. The shade highlighting stripe 222 helps the user to determine when the curved lens side 220 intersects the stationary target object.

In a next step S10, the user moves the positioning nut 166 on the side 102, 104 of the user's dominant eye into the tightened position to hold the shade 200, 200' on the dominant side in the personal optimized position.

With either the shade 200, 200' on the side 102, 104 of the user's non-dominant eye in the personal optimized position and the shade 200, 200' on the side 102, 104 of the user's dominant eye removed, or both the shade 200, 200' on the side 102, 104 of the user's non-dominant eye and the shade 200, 200' on the side 102, 104 of the user's dominant eye in the personal optimized positions, the user is able to perform activities while focused on an optimal field of vision.

Figure 5C:
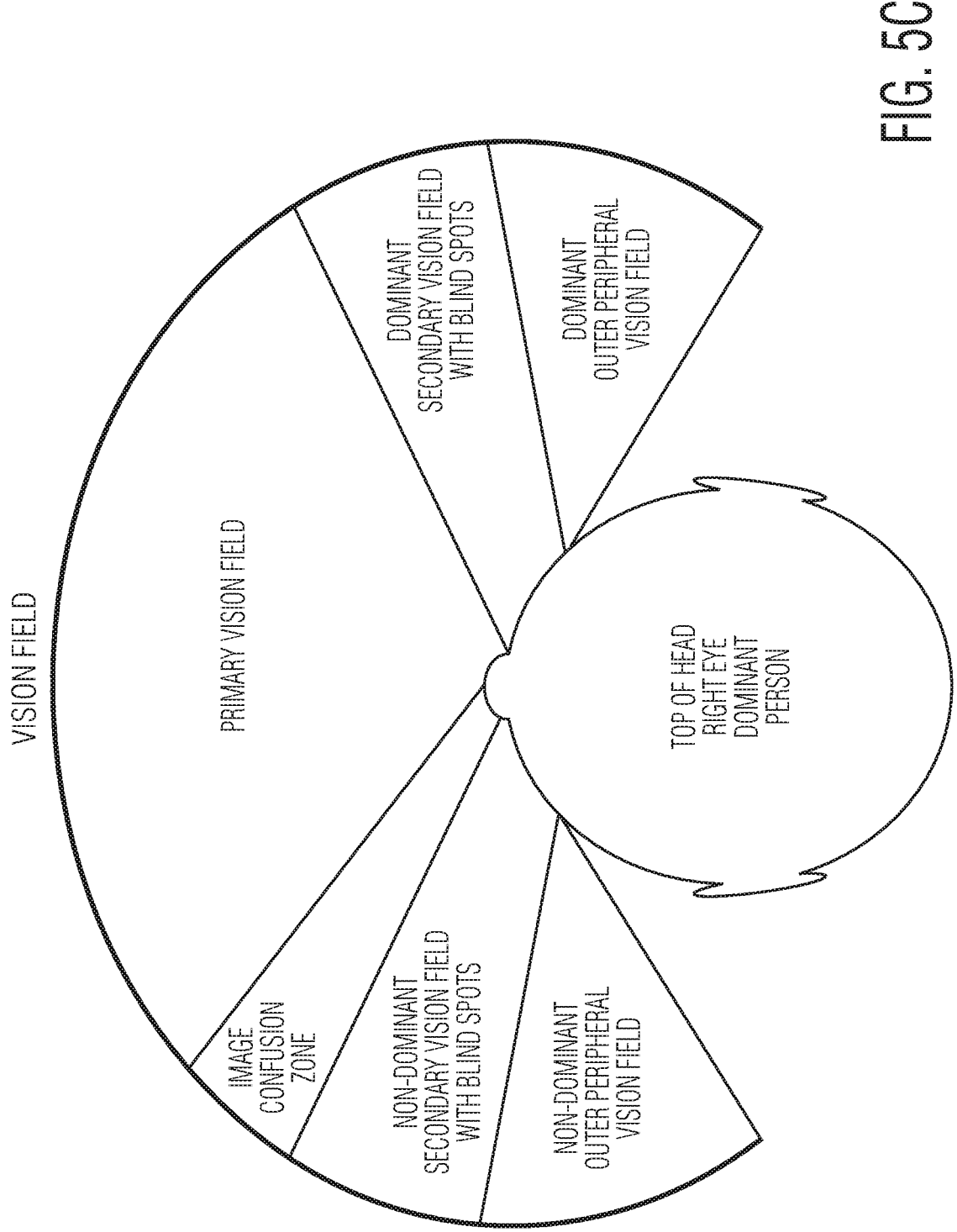
FIG. 5C is a schematic diagram of a vision field of the user.

A vision field of a user, using an exemplary vision field of a right eye dominant user, is shown in FIG. 5C. The user's primary vision field is the most accurate portion of the field of vision (especially when aiming and image tracking), is influenced by the location of the dominant eye, and incorporates visual input from both eyes. On a dominant side of the primary vision field, the user has a dominant secondary vision field in which the user receives visual input only through the user's dominant eye; vision input from the non-dominant eye in this secondary vision field is blocked by physical features of the user such as the bridge of the user's nose or the user's eye socket. The precise location and range of the primary vision field is also determined by other physical features of the user's head such as an interpupillary distance between the user's eyes. These physical features combine to block portions of the vision field for each of the user's eyes and, correspondingly, dictate the location and range of the various portions of the vision field described herein.

On a non-dominant side of the primary vision field, an image confusion zone exists in which the user is still receiving visual input from both eyes but input from the dominant eye begins to be obscured by the user's physical features. The input from the user's dominant eye is completely obscured by the user's physical features and the user only receives visual input through the user's non-dominant eye in the non-dominant secondary vision field. Both the dominant secondary vision field and the non-dominant secondary vision field, extending through the outer peripheral vision fields, have blind spot zones due to areas on the user's retina where the optic nerve attaches to the retina and no rods or cones exist. Outer peripheral vision fields are located outside the secondary vision fields, where visual perception is decreased, and sensitivity to motion and faint light sources under low light conditions is increased. The precise position of the image confusion zone, secondary vision fields, outer peripheral vision fields, and primary vision field within the vision field will therefore vary based on a user's eye and face shape and are particular to the vision field and gaze position of the user as well as the speed, direction of travel, and size of the object being viewed. A similar view for a left eye dominant user would simply have the fields mirrored from what is shown in FIG. 5C.

When set in the personal optimized position, the shade 200, 200' on the side 102, 104 of the user's non-dominant eye is positioned in the image confusion zone and the non-dominant secondary vision field shown in FIG. 5C that are portions of the vision field particular to the user. The shade 200, 200' on the side 102, 104 of the user's dominant eye, if not removed, is positioned in the dominant secondary vision field shown in FIG. 5C that is particular to the vision field of the user. The user can view the primary vision field particular to the user through the eyewear without looking through the shades 200, 200'.

The shades 200, 200', although transparent, indicate the primary vision field and encourage the user to view a target through the user's personal primary vision field in which the user's visual perception has a highest accuracy. By being aware of areas with decreased vision accuracy due to the presence and personalized position of the shades 200, 200', the user will make adjustments in his or her eye position, head position, and body position to align the primary vision field with the target, adapting the user's posture in various activities to optimize the use of the user's vision field with the highest accuracy. The eyewear thus helps the user learn to improve vision accuracy and decreases issues that can arise outside of the primary vision field. Additionally, if the user wears the eyewear during training, a third party such as a coach or supervisor can observe the eye, head, and body position of the user and can determine whether the user is using the primary vision field; the third party can then also use the eyewear to diagnose sources of potential or actual safety issues or performance errors. Further, because the shades 200, 200' are transparent, the user can still view objects or potential safety hazards outside of the primary vision field, ensuring that the user can still react to such issues when necessary.

In an embodiment, when the user uses the eyewear during travel or other activities known to cause motion sickness, the user can move either one or both shades 200, 200' to cover a larger area of the lens areas 140. In an embodiment, only the shade 200, 200' on the side of the non-dominant eye is positioned in the travel position. From the personal optimized position indicated by the personal optimized position gauge 252 shown in FIG. 3, the user moves the positioning nut 166 to the loosened position and moves the shade 200, 200' along the front to rear axis A further toward the extended position. The user moves the shade 200, 200' along the front to rear axis A to a travel position indicated by the range of the travel position gauge 254, shown in FIG. 3, before moving the positioning nut 166 back to the tightened position to hold the shade 200, 200' in the desired travel position against the end section 120. By encouraging the user to view an even narrower primary vision field, the eyewear adjusted for travel helps the user to avoid motion sickness. In embodiments in which the shade 200, 200' is intended to be used to avoid motion sickness, the contoured body 210 may be formed of an opaque or nearly opaque material configured to block a greater percentage of optical stimulation.

Figure 6:
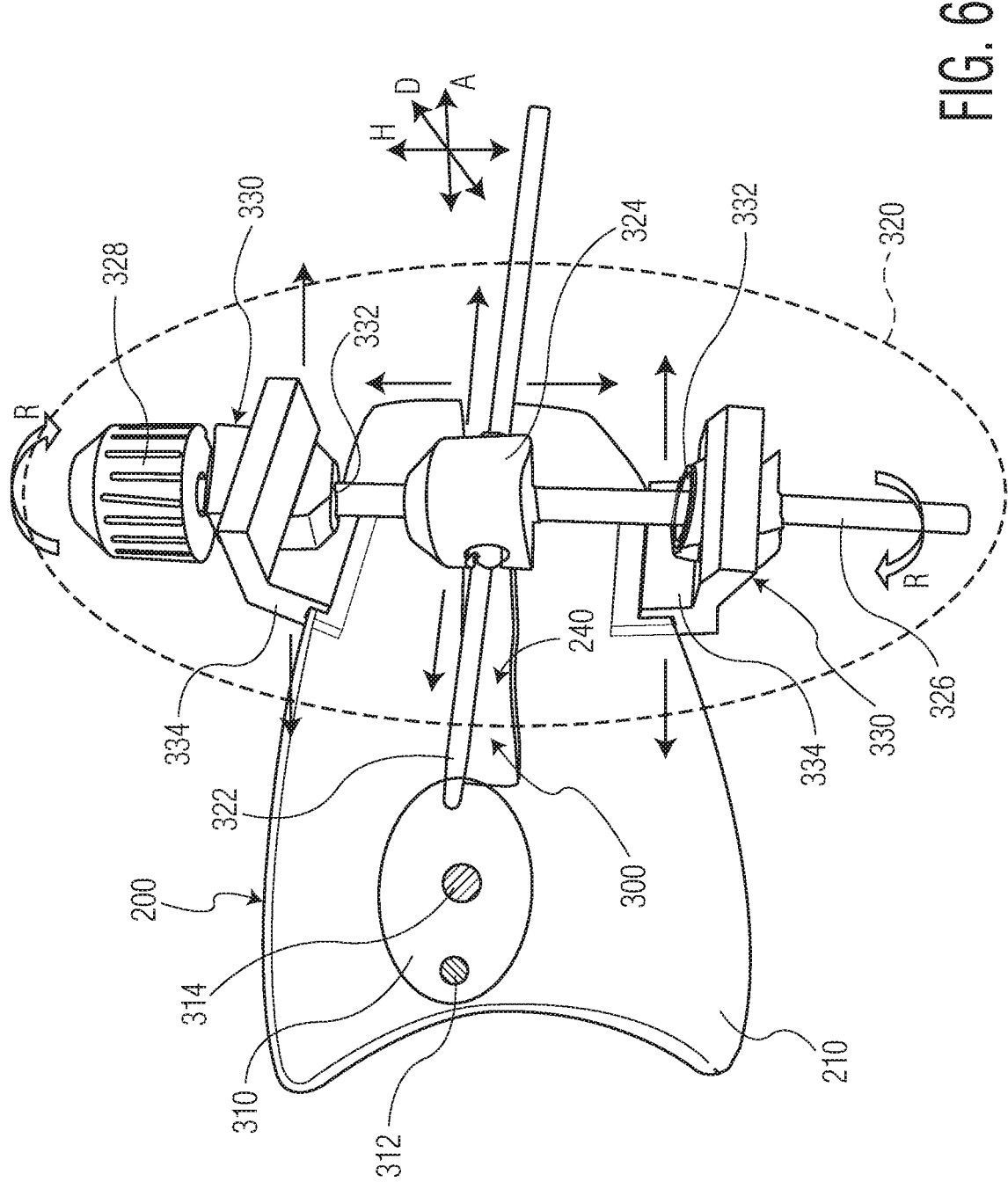
FIG. 6 is a front view of a blind spot zone indicator embodiment of the eyewear.

In an embodiment, the eyewear can be used with a blind spot zone indicator 300 shown in FIG. 6 that can be attached to one of or both of the shades 200, 200'. The blind spot zone indicator 300 is used to indicate one of a plurality of blind spot zones of a user in the non-dominant secondary vision field and/or the dominant secondary vision field shown in FIG. 5C based on a gaze or eye position of the user.

The blind spot zone indicator 300, as shown in FIG. 6, includes a blind spot indicating tab 310 attached to a tab positioning apparatus 320 that is adapted to move the blind spot indicating tab 310 into a plurality of different gaze positions.

The blind spot indicating tab 310, as shown in FIG. 6, is a transparent piece of material having a viewing target mark 312 and a blind spot indicator mark 314 disposed on the blind spot indicating tab 310. The blind spot indicator mark 314 is spaced apart from the viewing target mark 312. Both the viewing target mark 312 and the blind spot indicator mark 314 may have a circular or irregular shape; the viewing target mark 312 and the blind spot indicator mark 314 may have different sizes and/or different colors for differentiation to the user.

The tab positioning apparatus 320, as shown in FIG. 6, is attached to the shade 200 and is connected to the blind spot indicating tab 310. The tab positioning apparatus 320 is adapted to position the blind spot indicating tab 310 in the plurality of different gaze positions with respect to the shade 200. The tab positioning apparatus 320 includes a tab positioning rod 322 connected to the blind spot indicating tab 310, a rod mounting guide 324 through which the tab positioning rod 322 extends, a vertical adjustment rod 326 extending through the rod mounting guide 324 and a plurality of rod guides 330 attached to the shade 200, and a position adjustment knob 328 disposed on an end of the vertical adjustment rod 326.

As shown in FIG. 6, a first end of the tab positioning rod 322 is attached to the blind spot indicating tab 310 and an opposite second end of the tab positioning rod 322 extends through the rod mounting guide 324. The tab positioning rod 322 is movable within the rod mounting guide 324 along its longitudinal length. In another embodiment, the tab positioning rod 322 is fixed to the rod mounting guide 324 and is capable of telescoping to move the blind spot indicating tab 310. In another embodiment, the tab positioning rod 322 can be omitted and the blind spot indicating tab 310 can be connected directly to the rod mounting guide 324. The rod mounting guide 324 is movable along the height axis H along the vertical adjustment rod 326 and between the rod guides 330.

The rod guides 330, as shown in FIG. 6, each include a rod passageway 332 extending through the rod guide 330 and a slider rail 334 attached to an edge of the shade 200. The vertical adjustment rod 326 extends through the rod passageway 332 of each of the rod guides 330. In an embodiment, a portion of each of the rod guides 330 having the rod passageway 332 is formed of a rubber material to hold the vertical adjustment rod 326 in position. The slider rail 334 is attached to the edge of the shade 200 such that slider rail 334 of the rod guides 330 on opposing edges of the shade 200 attach the tab positioning apparatus 320 to the shade 200 and permit the tab positioning apparatus 320 to move along the front to rear axis A with respect to the shade 200. The rod guides 330 are adapted to remain attached to the shade 200 while moving closer together or further apart along the front to rear axis A according to a shape of the shade 200.

The position adjustment knob 328 disposed on the end of the vertical adjustment rod 326 is rotatable along a rotation direction R, shown in FIG. 6, and correspondingly rotates the vertical adjustment rod 326 within the rod guides 330. The rotation of the vertical adjustment rod 326 also rotates the blind spot indicating tab 310 closer to or further from the shade 200. The tab positioning apparatus 320, through manipulation of the various components described above, allows the blind spot indicating tab 310 to be moved in three dimensions to overlap with all portions of the shade 200 along a depth axis D shown in FIG. 6.

The blind spot zone indicator 300 shown in FIG. 6 can be attached to one of or both of the shades 200, 200' as described above while the shades 200, 200' are attached to the eyewear frame 100 at the shade positioning assemblies 160. With the shades 200, 200' positioned at the personal optimized positions as described above, the blind spot zone indicator 300 attached to the shade 200, 200' is used indicate one of the plurality of blind spot zones of the user. When the blind spot zone indicator 300 is attached to the shade 200, 200' on the side 102, 104 of the user's non-dominant eye, the blind spot zone indicator 300 is used to indicate blind spot zones within the non-dominant secondary vision field shown in FIG. 5C. Likewise, when the blind spot zone indicator 300 is attached to the shade 200, 200' on the side 102, 104 of the user's dominant eye, the blind spot zone indicator 300 is used indicate blind spot zones within the dominant secondary vision field shown in FIG. 5C.

To indicate the blind spot zones in either the dominant or the non-dominant secondary vision field, with the shade 200, 200' positioned at the personal optimized position, the user manipulates the tab positioning apparatus 320 to center the viewing target mark 312 of the blind spot indicating tab 310 on an object of interest in the secondary vision field viewed through the shade 200, 200'. With the viewing target mark 312 centered on the object of interest, the blind spot indicator mark 314 on the blind spot indicating tab 310 indicates a blind spot location of the user. The user can manipulate the tab positioning apparatus 320 to center the viewing target mark 312 on a plurality of different objects of interest in the secondary vision field for a plurality of different gazes of the user and, consequently, and determine a plurality of different blind spot zones in the secondary vision field.

The indication of the user's blind spot zone related to a particular gaze and object of interest using the blind spot zone indicator 300 allows the user to remain aware of the limits of the user's vision field. The blind spot zones indicated by the blind spot indicator mark 314 of the blind spot zone indicator 300 are tailored to the users personal optimized positions and remind the user to change eye position, head position, and body position to account for the blind spot zones during activities for safety and to avoid performance errors.

What is claimed is:

1. An eyewear with an adjustable indication of vision field, comprising:
    an eyewear frame having a right side, a left side opposite the right side, and a pair of lens areas positioned between the right side and the left side and adapted to be aligned with a pair of eyes of a user;
    a shade positioning assembly attached to one of the right side and the left side of the eyewear frame; and
    a shade formed of a transparent material, the shade attached to the eyewear frame at the shade positioning assembly, the shade is movable along the shade positioning assembly to a plurality of positions and is holdable in each of the plurality of positions among which the shade covers a varying amount of one of the lens areas, the plurality of positions include a personal optimized position in which the shade is positioned over the one of the lens areas in a portion of a vision field of the user outside of a primary vision field of the user.

2. The eyewear of claim 1, wherein the shade is attached to the shade positioning assembly at one of the left side and the right side of the eyewear frame that corresponds to a side of a non-dominant eye of the user.

3. The eyewear of claim 1, wherein the eyewear frame includes a bridge positioned between the lens areas and a pair of end sections each positioned on one of the right side and the left side of the eyewear frame, each of the lens areas is positioned between the bridge and one of the end sections.

4. The eyewear of claim 3, wherein the lens areas are each formed of a solid material and are monolithically formed in a single piece with the bridge and the end sections.

5. The eyewear of claim 3, wherein the eyewear frame includes a top bar connecting the bridge and the end sections, and the lens areas are open spaces with the bridge, the top bar, and the end sections extending around the eyes of the user.

6. The eyewear of claim 3, wherein the eyewear frame includes a pair of arms each extending from one of the end sections and hingeably connected to one of the end sections.

7. The eyewear of claim 3, wherein the bridge has a delineator stripe disposed on a side of the bridge along an intersection of the bridge with one of the lens areas.

8. The eyewear of claim 3, wherein the shade positioning assembly is attached to the eyewear frame at one of the end sections and the shade positioning assembly includes a guide post and a positioning stem extending out from the end section in a direction perpendicular to a surface of the end section.

9. The eyewear of claim 8, wherein the guide post and the positioning stem are aligned with one another along a front to rear axis and are spaced apart from one another along the front to rear axis.

10. The eyewear of claim 3, further comprising a pair of shade positioning assemblies each attached to the eyewear frame at one of the end sections and a pair of shades each attached to the eyewear frame at one of the shade positioning assemblies, the shades are each movable along the one of the shade positioning assemblies to cover the varying amount of one of the lens areas.

11. The eyewear of claim 8, wherein the shade positioning assembly includes a positioning nut disposed on an end of the positioning stem opposite the end section and movable along the positioning stem between a loosened position and a tightened position.

12. The eyewear of claim 11, wherein the shade has a contoured body formed of the transparent material with a curved lens side, an arm side opposite the curved lens side, and an adjustment slot extending through the contoured body.

13. The eyewear of claim 12, wherein the transparent material of the shade has a different color than the lens areas.

14. The eyewear of claim 12, wherein the guide post and the positioning stem are positioned in the adjustment slot and the shade is positioned between the one of the end sections and the positioning nut.

15. The eyewear of claim 14, wherein the guide post and the positioning stem move along the adjustment slot as the shade moves along the shade positioning assembly into the plurality of positions between a retracted position and an extended position, the shade does not cover the one of the lens areas in the retracted position and covers a maximum portion of the one of the lens areas in the extended position.

16. The eyewear of claim 15, wherein the positioning nut secures the shade in one of the plurality of positions when the positioning nut is moved to the tightened position.

17. The eyewear of claim 15, wherein the shade includes a personal optimized position gauge indicating a personal optimized position of the plurality of positions in which the shade covers a portion particular to a vision field of the user of the one of the lens areas.

18. The eyewear of claim 17, wherein the shade includes a travel position gauge indicating a travel position of the plurality of positions in which the shade covers a larger portion of the one of the lens areas than in the personal optimized position.

19. The eyewear of claim 12, wherein the contoured body has a contoured shape between the curved lens side and the arm side that is adapted to a contoured shape of the eyewear frame extending along the one of the lens areas and the one of the end sections.

20. The eyewear of claim 12, wherein the curved lens side has a curved shape adapted to match a curved shape of a structure that delineates an edge of a vision field of the user.

21. The eyewear of claim 20, wherein the structure that delineates the edge of the vision field of the user is an intersection of the bridge with one of the lens areas on an opposite side of the eyewear frame.

22. The eyewear of claim 12, wherein the shade has a shade highlighting stripe disposed along the curved lens side.

23. The eyewear of claim 22, wherein the transparent material of the shade is clear.

24. The eyewear of claim 1, further comprising a blind spot zone indicator including a blind spot indicating tab and a tab positioning apparatus, the tab positioning apparatus is attached to the shade and is adapted to move the blind spot indicating tab into a plurality of different gaze positions.

25. The eyewear of claim 24, wherein the blind spot indicating tab is a transparent piece of material having a viewing target mark and a blind spot indicator mark spaced apart from the viewing target mark.

26. The eyewear of claim 25, wherein the tab positioning apparatus includes a pair of rod guides each having a slider rail attached to an edge of the shade and movable along the edge of the shade.

27. The eyewear of claim 26, wherein the tab positioning apparatus includes a rod mounting guide connected to the blind spot indicating tab, a vertical adjustment rod extending through the rod mounting guide, and a position adjustment knob disposed on an end of the vertical adjustment rod.

28. The eyewear of claim 27, wherein the rod guides, the rod mounting guide, the vertical adjustment rod, and the position adjustment knob are adapted to move the blind spot indicating tab in three dimensions with respect to the shade.

29. An eyewear with an indication of vision field, comprising:
an eyewear frame having a right side, a left side opposite the right side, a pair of lens areas positioned between the right side and the left side and adapted to be aligned with a pair of eyes of a user, and a bridge positioned between the lens areas; and
a shade formed of a transparent material and disposed on the eyewear frame in a personal optimized position in which the shade is positioned over one of the lens areas in a portion of a vision field of the user outside of a primary vision field of the user, the shade has a curved lens side positioned over the one of the lens areas, the curved lens side has a shape matching a shape of a structure that delineates an edge of a vision field of the user, the structure that delineates the edge of the vision field of the user is an intersection of the bridge with one of the lens areas on an opposite side of the eyewear frame or is part of a nose of the user.

30. The eyewear of claim 29, wherein the shape of the curved lens side is concavely curved.

31. An eyewear with an adjustable indication of vision field, comprising:
an eyewear frame having a right side, a left side opposite the right side, and a pair of lens areas positioned between the right side and the left side and adapted to be aligned with a pair of eyes of a user, the eyewear frame includes a bridge positioned between the lens areas and a pair of end sections each positioned on one of the right side and the left side of the eyewear frame, each of the lens areas is positioned between the bridge and one of the end sections, the bridge has a delineator stripe disposed on a side of the bridge along an intersection of the bridge with one of the lens areas;

a shade positioning assembly attached to one of the right side and the left side of the eyewear frame; and a shade formed of a transparent material, the shade attached to the eyewear frame at the shade positioning assembly and movable along the shade positioning assembly to a plurality of positions among which the shade covers a varying amount of one of the lens areas, the plurality of positions include a personal optimized position in which the shade is positioned over the one of the lens areas in a portion of a vision field of the user outside of a primary vision field of the user.

32. An eyewear with an adjustable indication of vision field, comprising:

an eyewear frame having a right side, a left side opposite the right side, and a pair of lens areas positioned between the right side and the left side and adapted to be aligned with a pair of eyes of a user, the eyewear frame includes a bridge positioned between the lens areas and a pair of end sections each positioned on one of the right side and the left side of the eyewear frame, each of the lens areas is positioned between the bridge and one of the end sections;

a shade positioning assembly attached to one of the right side and the left side of the eyewear frame, the shade positioning assembly is attached to the eyewear frame at one of the end sections and the shade positioning assembly includes a guide post and a positioning stem extending out from the end section in a direction perpendicular to a surface of the end section; and a shade formed of a transparent material, the shade attached to the eyewear frame at the shade positioning assembly and movable along the shade positioning assembly to a plurality of positions among which the shade covers a varying amount of one of the lens areas, the plurality of positions include a personal optimized position in which the shade is positioned over the one of the lens areas in a portion of a vision field of the user outside of a primary vision field of the user.

33. An eyewear with an adjustable indication of vision field, comprising:

an eyewear frame having a right side, a left side opposite the right side, and a pair of lens areas positioned between the right side and the left side and adapted to be aligned with a pair of eyes of a user;

a shade positioning assembly attached to one of the right side and the left side of the eyewear frame;

a shade formed of a transparent material, the shade attached to the eyewear frame at the shade positioning assembly and movable along the shade positioning assembly to a plurality of positions among which the shade covers a varying amount of one of the lens areas, the plurality of positions include a personal optimized position in which the shade is positioned over the one of the lens areas in a portion of a vision field of the user outside of a primary vision field of the user; and a blind spot zone indicator including a blind spot indicating tab and a tab positioning apparatus, the tab positioning apparatus is attached to the shade and is adapted to move the blind spot indicating tab into a plurality of different gaze positions.

* * * * *